United States Patent [19]

Petz et al.

[11] 4,342,602
[45] Aug. 3, 1982

[54] DULLING AGENT ON THE BASIS OF WAX FOR VARNISHES, AND PROCESS FOR THE MANUFACTURE THEREOF

[75] Inventors: Karl Petz, Neusäss; Klaus Rieger, Gersthofen; Dieter Steidl, Hofheim am Taunus, all of Fed. Rep. of Germany

[73] Assignee: Hoechst Aktiengesellschaft, Fed. Rep. of Germany

[21] Appl. No.: 197,244

[22] Filed: Oct. 15, 1980

[30] Foreign Application Priority Data

Oct. 20, 1979 [DE] Fed. Rep. of Germany ....... 2942487

[51] Int. Cl.³ .......................... C08K 5/01; C08K 5/20; C08L 91/06; C09D 7/12
[52] U.S. Cl. .................................... 106/316; 106/191; 106/192; 106/270; 106/288 Q; 106/245; 524/227; 524/33
[58] Field of Search ............... 106/270, 316, 191, 192, 106/288 Q, 245; 260/28 R, 13

[56] References Cited

U.S. PATENT DOCUMENTS

| | | | |
|---|---|---|---|
| 2,433,833 | 1/1948 | Aver | 106/192 |
| 3,048,551 | 8/1962 | Lutz | 106/270 |
| 3,441,628 | 4/1969 | Rätzsch et al. | 106/270 |

FOREIGN PATENT DOCUMENTS

| | | | |
|---|---|---|---|
| 647416 | 7/1937 | Fed. Rep. of Germany | 106/192 |
| 2713550 | 10/1978 | Fed. Rep. of Germany . | |

*Primary Examiner*—Allan Lieberman
*Attorney, Agent, or Firm*—Connolly and Hutz

[57] ABSTRACT

The invention provides a process for the manufacture of a polyethylene wax micro-powder, 99 weight % of which has a grain size of less than 15 microns, for the dulling of varnishes. Such a micro-powder generally cannot be obtained without difficulty by grinding; in accordance with the invention this is possible, however, by grinding the polyethylene wax together with an amide wax.

3 Claims, No Drawings

DULLING AGENT ON THE BASIS OF WAX FOR VARNISHES, AND PROCESS FOR THE MANUFACTURE THEREOF

By incorporation of solids in very fine distribution into paints and varnishes, systems are obtained which cause diffuse scattering of incident light. The refractive index of the dulling agent added should be near that of the binder, so that the presence of the dulling agent in the varnish film practically cannot be detected in transmitted light.

Alternatively to inorganic dulling agents, the use of waxes of diverse composition for the dulling of varnishes is known for many years (Handbuch der Nitrocelluloselacke, Kraus, Part 2, p. 116; Seifen-Öle-Fette-Wachse, 102, No. 6/1976, p. 163). Normally, the waxes had to be melted, and incorporation into the varnish or the solvent and agitation in cold state gave free-flowing dispersions or paste-like formulations with which the varnishes could be dulled as intended. However, this operation mode was time-consuming and risky with respect to fire.

In order to avoid these difficulties, micronized hydrocarbons which have been on the market for some years have proved to be useful because of their easy incorporation without requiring a heat-treatment ("Mattierungsmittel für Lacke", Adhäsion 11/1977, p. 311-313; Lacke und Lösemittel, Verlag Chemie, Weinheim (1979), p. 15). Their combination with inorganic dulling agents is quite conventional. The experience gained with wax-like dulling agents has confirmed that especially micro-powders of polyethylene wax having a grain size distribution in a range of from 10 to 15 microns as upper limit meet excellently the requirements of the paint and varnish industry and are superior to dulling agents of other composition in many respects.

Micro-powder dulling agents are, for example, described in German Offenlegungsschrift No. 2,713,550; they consist of a ternary mixture of a polyolefin wax with an ester wax, or a partially saponified ester wax and a diester of a monocarboxylic acid with a diol or a monocarboxylic acid diamide, and they are adjusted by atomization of the mixture of wax melts and subsequent classification in such a manner that from 60 to 80% have a grain size of from 1 to 15 microns.

Such a process requires much technological expenditure and thus increased cost. On the other hand, it is known by experience that it is very difficult to convert polyolefin waxes to the grain size range required for dulling varnishes by mechanical pulverization in one single process step (Farbe und Lack 80, No. 4 (1974) p. 307). It is therefore the object of the present invention to provide an operation mode for manufacturing micro-powders which not only allows one to obtain the intended dulling effect, but which also produces micro powers that can be easily dispersed in the varnishes to be dulled, and impart to the varnish surface a smooth, velvet-like feel and a good mar resistance as well as a good resistance to the so-called "polishing".

Surprisingly, it has been found that polyolefin waxes can be easily pulverized by grinding to obtain the intended fineness of grain when hard and brittle amide wax is added in the grinding operation.

The invention provides therefore a process for the manufacture of a dulling agent for varnishes, 99% of which have a grain sizes distribution of less than 15 microns, which comprises subjecting a polyolefin wax having an average molecular weight of from 1,000 to 9,000 and an amide wax having a yield/drop point of from 130° to 150° C. to common grinding in a weight ratio of from 90:10 to 10:90.

The invention provides furthermore the dulling agents for varnishes manufactured according to this process, and varnishes containing such dulling agents.

The operation mode of the invention allows one to obtain the intended micro-powders 99% of which (relative to the amount of starting material) have a grain size of less than 15 microns with acceptable energy expenditure in a practically quantitative yield and without requiring additional classification. This was not to be expected and must be considered as a remarkable technical progress.

As to the effectiveness of the micro-powders manufactured according to the invention, it has been observed that the amide wax portion in the dulling agents, although not participating in producing the dulling effect, surprisingly supports the influence of the dulling component on the surface of the varnish coat by improving the smoothing activity and thus the insensitivity to marring resulting therefrom. This was not to be expected at all; for, it had to be supposed tht the amide wax would act only as grinding auxiliary and that its presence, at least in a high concentration, would rather be disadvantageous with respect to overvarnishing and adhesion.

By polyolefin wax, one of the two components of the dulling agents of the invention, there are to be understood homo- and copolymers of ethylene, propylene or butylene having a melting point in the range of from 90° to 140° C., and an average molecular weight of from 1,000 to 9,000, preferably 2,000 to 4,000. Ethylene/propylene copolymers the ethylene amount of which is the larger one are preferred.

Suitable amide waxes are reaction products of industrial grade fatty acids having from 12 to 34, preferably 12 to 18, carbon atoms with bivalent aliphatic amines having from 2 to 6 carbon atoms, such as ethylene diamine, propylene diamine or hexamethylene diamine having a flow point/drop point of from 130° to 150° C., preferably 140° to 145° C. Distearoyl-ethylene diamide is a preferred amide wax.

Suitable mills for the common grinding of polyolefin wax and amide wax are jet pulverizers or mechanical mills provided with classifier.

For the grinding operation, the two wax components in the form of powders, granules or scales are fed to the mill either in already mixed state or, preferably, separately but simultaneously. The weight ratio of polyolefin wax to amide wax is from 90:10 to 10:90, preferably 70:30 to 30:70, especially 60:40 to 40:60.

Due to its good dispersibility, the micro-powder obtained in accordance with the invention can be incorporated without difficulty in cold state into the varnish systems to be dulled by means of the usual agitators, impellers or dissolvers. Depending on the intended dulling effect which, as already mentioned, is essentially determined by the polyolefin wax component in the mixture, addition of from 1 to 4 weight % of the pulverulent dulling agent, relative to the varnish system, as sufficient in the case of unpigmented varnishes. In the case of pigmented paints, the amount of dulling agent must be increased. Predispersion in the corresponding solvents can accelerate distribution in the varnish.

The following examples illustrate the invention and demonstrate furthermore the use of the products in accordance with the invention in some typical varnish or paint formulations. The parts indicated are by weight in all cases.

EXAMPLE 1

250 kg of a wax mixture are fed per hour to a countercurrent impact pulverizer consisting of a grinding zone and an incorporated air classifier. This wax mixture is a crude 1:1 blend of distearoylethylene diamide manufactured by spraying and having a particle size of less than 400 microns, and a polyethylene wax (olefin polymerized wax having a molecular weight of about 3,000 and a drop point of 122°–127° C.) in the form of chips having edge lengths of from 2 to 4 mm. The starting products are fed to the air classifier by a dosing screw, and those particles which do not meet the fineness requirements are forced into the grinding zone by means of two opposite injectors driven by compressed air, where they collide frontally with one another and thus become micronized.

The ground product leaving the mill is discharged pneumatically by the air current into a silo with airing filter. The required amount of compressed air is 34 Nm$^3$/min. at 7 bar and 20° C. The rotor speed of the classifier is adjusted to 4,000 rpm. After a starting time of about 15 minutes, the 1:1 mixing ratio of the components is established in the product leaving the mill. According to a Coulter Counter analysis, 99% of the ground product has a particle size of less than 14 microns, and 50% has a particle size of less than 4.5 microns.

EXAMPLE 2

69 kg/h of the wax mixture used in Example 1 are introduced via a dosing screw into a mechanical classifier mill having a vertical axle. This mill is a combination of an impact pulverizer with a turbine classifier, and it is provided with a tangential material inlet and a suction pipe for fresh air. The fine powder obtained at a mixing speed of 4,000 rpm$^{-1}$, a classifying speed of 2,200 rpm$^{-1}$ and an air throughput of 3,100 m$^3$/h has the following particle size distribution:

99.5% less than 14.3 microns, 50% less than 6.0 microns.

EXAMPLE 3

A varnish batch is manufactured from
15 parts of collodion cotton (moist), of medium viscosity
10 parts of a cyclohexanone resin (Ketone resin N of BASF AG)
8 parts of dioctyl phthalate
2 parts of castor oil
35 parts of butyl acetate
10 parts of n-butanol
10 parts of ethylglycol, and
10 parts of toluene,
into which a dulling agent obtained according to Example 1 is incorporated by a 30 minutes' agitation at 3,000 rpm. The varnish is applied onto glass plates at a wet film thickness of 30 microns. After drying for 24 hours, the dulling effect is measured with the gloss measuring device according to Dr. B. Lange.

| Weight % of wax added relative to varnish | 0 | 0.25 | 0.5 | 1.0 | 2.0 |
|---|---|---|---|---|---|
| Gloss in % after 24 h | 100 | 46 | 35 | 28 | 8 |

Polishing of the varnished surfaces (load 750 g, 100 brush strokes) is impossible.

EXAMPLE 4

A humidity-hardening polyurethane varnish containing 42% of solids (Beckocoat PU 428 of Hoechst AG) is dulled as indicated in Example 3 with the micro-powder obtained according to Example 1.

| Weight % of wax added relative to varnish | 0 | 0.25 | 0.5 | 1.0 | 0.2 |
|---|---|---|---|---|---|
| Gloss in % after 24 h | 100 | 87 | 75 | 60 | 40 |

The film of dulled varnish cannot be polished any more.

EXAMPLE 5

An acid-catalyzed varnish containing 40% of solids (Beckurol HP 310 of Hoechst AG), to which 1 part of p-toluenesulfonic acid dissolved in 19 parts of n-butanol have been added as hardener per 100 parts of varnish batch, is dulled with the polyethylene wax micro-powder according to Example 1. The varnish coats are tested as indicated in Example 3. They cannot be polished any more.

| Weight % of wax added relative to varnish system | 0 | 0.25 | 0.5 | 1.0 | 2.0 |
|---|---|---|---|---|---|
| Gloss in % after 24 hours | 100 | 55 | 40 | 35 | 20 |

EXAMPLE 6

For the manufacture of a dull varnish containing white pigments, the dulling agent of Example 2 was incorporated into the following formulation (the dulling agent was first intermixed with the white pigments, and this mixture was then ground in a hopper mill together with the binder and the solvent):
35 parts of a linseed oil alkyd resin containing 62% of oil (Alftalat AL 650 of Hoechst AG)
30 parts of white spirit
15 parts of titanium dioxide
9 parts of coated chalk (Millicarb of Messrs. Plüss-Stauffer)
1 part of a siccative on the basis of Co—Pb—Mn.

The varnish coats were tested as indicated in Example 3. The coats cannot be polished any more.

| Weight % of wax added relative to varnish | 0 | 5 | 10 |
|---|---|---|---|
| Gloss in % after 24 hours | 100 | 48 | 24 |

What is claimed is:

1. A process for the manufacture of a, wax micropowder dulling agent for varnishes, 99% of which has a grain size distribution of less than 15 microns, which comprises subjecting a polyolefin wax having an average molecular weight of from 1,000 to 9,000 and an amide wax having a flow point/drop point of from 130° to 150° C. to common grinding in a weight ratio of from 90:10 to 10:90, wherein the amide wax is the reaction product of a fatty acid having from 12 to 34 carbon atoms and a bivalent aliphatic amine having from 2 to 6 carbon atoms.

2. A dulling agent for varnishes obtained as claimed in claim 1.

3. A process for improving the capacity of polyolefin wax having an average molecular weight of from 1,000 to 9,000 to be ground to a micro-powder 99% by weight of which has a grain size of less than 15 microns, which comprises carrying out the grinding with addition of an amide wax from a fatty acid having from 12 to 34 carbon atoms and a bivalent aliphatic amine having from 2 to 6 carbon atoms, the amide wax having a flow point/drop point of from 130° to 150° C.; the weight ratio of polyolefin wax to amide wax being from 90:10 to 10:90.

* * * * *

UNITED STATES PATENT AND TRADEMARK OFFICE
CERTIFICATE OF CORRECTION

PATENT NO. : 4,342,602
DATED : AUGUST 3, 1982
INVENTOR(S) : KARL PETZ ET AL

It is certified that error appears in the above-identified patent and that said Letters Patent is hereby corrected as shown below:

In column 4, line 13 (the first line of numerical data in the table of Example 4), "0.2" should read -- 2.0 --.

Signed and Sealed this

Eighteenth Day of January 1983

[SEAL]

Attest:

GERALD J. MOSSINGHOFF

Attesting Officer — Commissioner of Patents and Trademarks